(12) United States Patent
Wiltamuth et al.

(10) Patent No.: US 7,873,958 B2
(45) Date of Patent: Jan. 18, 2011

(54) SYSTEM AND METHODS FOR PROVIDING VERSIONING OF SOFTWARE COMPONENTS IN A COMPUTER PROGRAMMING LANGUAGE

(75) Inventors: Scott Wiltamuth, Seattle, WA (US); Anders Hejlsberg, Seattle, WA (US); Peter F. Sollich, Munich (DE); Bradley M. Abrams, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1302 days.

(21) Appl. No.: 11/241,186

(22) Filed: Sep. 30, 2005

(65) Prior Publication Data

US 2006/0026568 A1  Feb. 2, 2006

Related U.S. Application Data

(63) Continuation of application No. 09/900,111, filed on Jul. 5, 2001, now Pat. No. 6,981,250.

(51) Int. Cl.
*G06F 9/44* (2006.01)
(52) U.S. Cl. .............. 717/170; 717/122; 717/108; 717/116; 717/118; 717/120; 717/117; 707/690; 707/695
(58) Field of Classification Search ............ 717/108, 717/116, 170, 122, 120; 707/690, 695, 755
See application file for complete search history.

(56) References Cited

U.S. PATENT DOCUMENTS

| | | | |
|---|---|---|---|
| 4,558,413 A * | 12/1985 | Schmidt et al. ............. 1/1 |
| 4,965,743 A * | 10/1990 | Malin et al. ................ 706/45 |
| 5,481,712 A | 1/1996 | Silver et al. |
| 5,586,329 A * | 12/1996 | Knudsen et al. ............. 717/108 |
| 5,632,022 A | 5/1997 | Warren et al. |
| 5,680,619 A | 10/1997 | Gudmundson et al. |
| 5,689,711 A * | 11/1997 | Bardasz et al. ............. 717/105 |
| 5,706,510 A * | 1/1998 | Burgoon ........................... 1/1 |
| 5,781,730 A | 7/1998 | Reimer et al. .......... 395/200.33 |
| 5,787,262 A * | 7/1998 | Shakib et al. ............... 709/205 |
| 5,805,899 A | 9/1998 | Evans et al. ................. 395/712 |
| 5,812,773 A * | 9/1998 | Norin ........................ 709/204 |
| 5,848,273 A | 12/1998 | Fontana et al. |
| 5,872,973 A * | 2/1999 | Mitchell et al. ............. 719/332 |
| 5,878,432 A * | 3/1999 | Misheski et al. ........ 707/103 R |
| 5,890,176 A | 3/1999 | Kish et al. .................. 707/511 |
| 5,907,704 A | 5/1999 | Gudmundson et al. ...... 395/701 |
| 5,920,718 A | 7/1999 | Uczekaj et al. |

(Continued)

OTHER PUBLICATIONS

Title: A layered architecture for uniform version management, author: Westfechtel, B.et al, dated: Aug. 7, 2002, source: IEEE.*

(Continued)

*Primary Examiner*—Chameli C Das
(74) *Attorney, Agent, or Firm*—Woodcock Washburn LLP

(57) ABSTRACT

A system and methods for versioning software components in connection with a computer programming language are provided. In exemplary aspects, the versioning system makes use of intelligent defaults, provides a vehicle for unambiguous specification of developer intent and implements conflict resolution rules in connection with the versioning of software components. In another aspect, the versioning system bounds names at run-time, but does not bound offsets at compile-time.

18 Claims, 12 Drawing Sheets

```
// version 2
using System;
using FirstParty.Component;
namespace SecondParty.Application {
        class B: A {                    414b
                new public void G() {
        432         Console.WriteLine("B.G");
                }
                static void Main() {
                        B b = new B();
                        b.G();
                }
        }
}
```
430

U.S. PATENT DOCUMENTS

| | | | |
|---|---|---|---|
| 5,956,513 A * | 9/1999 | McLain, Jr. .................. | 717/142 |
| 6,023,579 A | 2/2000 | Hellgren et al. | |
| 6,059,838 A | 5/2000 | Fraley et al. | |
| 6,085,198 A | 7/2000 | Skinner et al. ............... | 707/103 |
| 6,112,024 A * | 8/2000 | Almond et al. .............. | 717/122 |
| 6,125,371 A * | 9/2000 | Bohannon et al. ........... | 707/695 |
| 6,158,049 A * | 12/2000 | Goodwin et al. ............ | 717/158 |
| 6,182,160 B1 | 1/2001 | Burgess | |
| 6,195,462 B1 * | 2/2001 | Bryniarski et al. .......... | 382/239 |
| 6,199,195 B1 | 3/2001 | Goodwin et al. | |
| 6,205,465 B1 | 3/2001 | Schoening et al. .......... | 709/102 |
| 6,226,652 B1 * | 5/2001 | Percival et al. .............. | 707/695 |
| 6,226,788 B1 | 5/2001 | Schoening et al. ............. | 717/6 |
| 6,230,159 B1 | 5/2001 | Golde | |
| 6,230,312 B1 | 5/2001 | Hunt | |
| 6,230,314 B1 | 5/2001 | Sweeney et al. | |
| 6,269,473 B1 * | 7/2001 | Freed et al. .................. | 717/104 |
| 6,282,712 B1 * | 8/2001 | Davis et al. .................. | 717/170 |
| 6,314,434 B1 * | 11/2001 | Shigemi et al. ..................... | 1/1 |
| 6,317,754 B1 * | 11/2001 | Peng .......................... | 707/610 |
| 6,385,767 B1 * | 5/2002 | Ziebell ........................ | 717/170 |
| 6,442,460 B1 | 8/2002 | Larson et al. ................. | 701/33 |
| 6,442,748 B1 * | 8/2002 | Bowman-Amuah ......... | 717/108 |
| 6,442,754 B1 | 8/2002 | Curtis ......................... | 717/175 |
| 6,601,234 B1 * | 7/2003 | Bowman-Amuah ........ | 717/108 |
| 6,622,302 B1 * | 9/2003 | Delaney et al. ............. | 717/170 |
| 6,625,804 B1 | 9/2003 | Ringseth et al. ............. | 717/114 |
| 6,629,316 B1 | 9/2003 | Curtis ......................... | 717/174 |
| 6,658,659 B2 * | 12/2003 | Hiller et al. .................. | 717/170 |
| 6,684,395 B2 * | 1/2004 | Johnson et al. ............. | 717/162 |
| 6,698,015 B1 * | 2/2004 | Moberg et al. .............. | 717/154 |
| 6,701,513 B1 | 3/2004 | Bailey | |
| 6,721,942 B1 | 4/2004 | Sievert | |
| 6,721,952 B1 * | 4/2004 | Guedalia et al. .............. | 725/38 |
| 6,769,124 B1 | 7/2004 | Schoening .................. | 719/316 |
| 6,772,160 B2 * | 8/2004 | Cho et al. ........................... | 1/1 |
| 6,826,750 B1 * | 11/2004 | Curtis et al. ................. | 717/170 |
| 6,886,155 B2 | 4/2005 | Hasha | |
| 6,901,588 B1 * | 5/2005 | Krapf et al. .................. | 717/164 |
| 6,968,538 B2 | 11/2005 | Rust et al. | |
| 6,968,540 B2 | 11/2005 | Beck et al. | |
| 6,978,281 B1 * | 12/2005 | Kruy et al. .......................... | 1/1 |
| 6,981,250 B1 | 12/2005 | Wiltamuth et al. | |
| 6,986,132 B1 * | 1/2006 | Schwabe ..................... | 717/168 |
| 6,993,759 B2 | 1/2006 | Aptus et al. | |
| 7,055,130 B2 | 5/2006 | Charisius et al. | |
| 7,055,131 B2 | 5/2006 | Charisius et al. | |
| 7,103,873 B2 | 9/2006 | Tanner et al. | |
| 7,131,112 B1 * | 10/2006 | Bartz et al. .................. | 717/122 |
| 7,171,646 B2 | 1/2007 | Charisius et al. | |
| 7,181,731 B2 * | 2/2007 | Pace et al. ................... | 717/136 |
| 7,210,132 B2 | 4/2007 | Rivard et al. | |
| 7,225,426 B2 | 5/2007 | Frank et al. | |
| 7,322,024 B2 * | 1/2008 | Carlson et al. .............. | 717/120 |
| 7,610,316 B2 * | 10/2009 | Bartz et al. ......................... | 1/1 |
| 7,634,772 B2 * | 12/2009 | Parthasarathy et al. ...... | 717/178 |
| 7,657,887 B2 * | 2/2010 | Kothandaraman et al. ... | 717/176 |
| 2002/0073409 A1 | 6/2002 | Lundback et al. ........... | 717/170 |
| 2002/0147857 A1 | 10/2002 | Sanchez, II et al. ......... | 709/316 |
| 2003/0023957 A1 | 1/2003 | Bau, III et al. .............. | 717/140 |
| 2003/0037328 A1 * | 2/2003 | Cicciarelli et al. .......... | 717/178 |
| 2003/0046282 A1 * | 3/2003 | Carlson et al. .................. | 707/6 |
| 2003/0159135 A1 * | 8/2003 | Hiller et al. .................. | 717/166 |
| 2005/0154550 A1 * | 7/2005 | Singh et al. ................. | 702/108 |

OTHER PUBLICATIONS

Title: Persistent languages facilitate the implementation of software version management, author: Cooper et al, dated: Aug. 6, 2002, source: IEEE.*

Title: Version Management for tightly integrated software engineering environments, author: Sachweh et al, dated: Apr. 5, 1995, source: IEEE.*

Ahmed, R., et al., "Version management of composite objects in CAD databases," *ACM*, 1991, 218-227.

Bendix, L., et al., "CoEd—A Tool for Versioning of Hierarchical Documents," System Configuration Management, Boris Magnusson (Ed.), *ECOOP '98 SCM-8 Symposium*, Brussels, Belgium, *Springer*, Jul. 20-21, 1998, 173-187.

Biglari-Abhari, M., et al., "Improving binary compatibility in VLIW machines through compiler assisted dynamic rescheduling," *IEEE*, 2000, 386-393.

Bratsberg, S.E., "Unified class evolution by object-oriented views," 11th International Conference on the Entity-Relationship Approach, Pernul, G., et al. (Eds.), Karlsruhe, Germany, *Springer-Verlag*, Oct. 7-9, 1992, 423-439.

Clamen, S. et al., "Schema Evolution and Integration", *Distributed and Parallel Databases*, 1994, 2, 101-125.

Cohen, E.S., et al., "Version management in gypsy," *ACM*, 1988, 201-215.

Conradi, R. et al., "Change-oriented versioning: Rationale and evaluation", *Software Engineering and Its Applications—Proceedings: Third International Workshop*, Dec. 3-7, 1990, 1, 97-109.

Conradi, R. et al., "Version Models for Software Configuration Management", *ACM Computing Surveys*, Jun. 1998, 30:2, 232-282.

Dattolo, A., et al., "Analytical version control management in a hypertext system," *ACM*, 1994, 132-139.

De Castro, C. et al., "Schema Versioning for Multitemporal Relational Databases", *Information Systems*, 1997, 22:5, 249-290.

Drossopoulou, S. et al., "A Fragment Calculus- towards a model of separate compilation, linking and binary compatibility", *IEEE—Proceedings: 14th Symposium on Logic in Computer Science*, Jul. 2-5, 1999, Trento, Italy, 147-156.

Franconi, E. et al., "A Semantic Approach for Schema Evolution and Versioning in Object-Oriented Databases", *Computational Logic—CL 2000:• First International Conference*, Jul. 24-28, 2000, London, UK, J. Lloyd et al. (Eds.), 1048-1062.

Gal, A. et al., "A Multiagent Update Process in a Database with Temporal Data Dependencies and Schema Versioning", *IEEE Transactions on Knowledge and Data Engineering*, Jan./Feb. 1998, 10:1, 21-37.

Goldstein, T. C. et al, "The Object Binary Interface—C++ Objects for Evolvable Shared Class Libraries", *Proceedings of the 1994 Usenix C++ Conference*, Apr. 11-14, 1994, Cambridge, MA, 1-19.

Lewine, D.A., "Certifying Binary Applications", *Proceedings of the Spring 1992 EurOpera & USENIX Workshop*, Apr. 6-9, Jersey, Channel Islands, 25-32.

Oiwa, Y. et al., "Extending Java Virtual Machine with Integer-Reference Conversion", *Concurrency: Practice and Experience*, May 2000, 12:6, 407-22.

Oussalah, C. et al., "Complex Object Versioning", *Advanced Information Systems Engineering: 9th International Conference*, Jun. 16-20, 1997, 259-272.

Proper, H.A., "Data schema design as a schema evolution process", *Data & Knowledge Engineering*, 1997, 22, 159-189.

Roddick, J. F. "A Survey of schema versioning issues for database systems", *Information and Software Technology*, 1995, 37:7, 383-393.

Rose, E. et al., "Schema versioning in a temporal object-oriented data model", *International Journal on Artificial Intelligence Tools*, 1998, 7:3, 293-318.

Tsotras, V. et al., "Optimal Versioning of Objects", *Eighth International Conference on Data Engineering*, Feb. 2-3, 1992, Tempe, AZ, 358-365.

Urtado, C. et al., "Complex Entity Versioning at Two Granularity Levels", *Information Systems*, Feb. 12, 1998, 23:3/4, 197-216.

Wein, M., et al., "Visual support for version management," *ACM*, 1992, 1217-1223.

Wieczerzycki, W. et al., "Advanced versioning mechanisms supporting CSCW environments", *Journal of Systems Architecture*, 1997, 43, 215-227.

Albahari, B., et al., "C# essentials," 1st Ed., http://proquerst.safaribooksonline.com, *Safari Tech Books Online*, 25 pages.

Amano, N. et al., "LEAD: A Language for Dynamically Adaptable Applications," *IEICE Trans. Fundamentals*, 1998, E81-A(6), 992-1000.

Appelbaum, M. et al., "AGILE—A CAD/CAM/CAE Interface Language", *SME Technical Paper*, 1984, 1-19.

Chen, J-L et al., "An inheritance flow model for class hierarchy analysis," *Information Processing Letters*,1998, 66, 309-315.

Computer Dictionary, 3$^{rd}$ Ed., *Microsoft Press*, 1997, 3 pages.

"Defining custom attribute types," *Developer Connection*, http://developer.apple.com/documentation/QuickTime/QD3D/qd3dattributes.8.htm, 1997, 3 pages.

Eisenberg, M., "Programmable applications: exploring the potential for language/interface symbiosis", *Behaviour & Information Technology*, 1995, 14(1), 56-66.

Flanagan, D., "JAVA in a nutshell," *O'Reilly*, 1997, 15 pages.

Goddard, N.J., "Using the "C" programming language for interface control", *Laboratory Microcomputer*, Autumn 1982, 15-22.

Giumale, C., "Extensible Programming Systems—a way of Achieving Program Representativeness," *Buletinul Institutului Politehnic Gheorghe Gheorghiu-Dej Bucuresti, Seria Electrotehnica*, 1978, 40(4), 83-91 (English language abstract included).

Iannella, R., "Metadata Repositories Using PICS," *Research and Advanced Technology for Digital Libraries*, First European Conference, ECDL '97, Pisa, Italy, Sep. 1-3, 1997, 87-98.

Lethaby, N. et al., "Multitasking with C++", *Proceedings of the Fifth Annual Embedded Systems Conference*, Oct. 5-8, 1993, Santa Clara, CA, 103-120.

Lewis, J., "Logic programming to facilitate understanding of Z specifications," *Software Engineering in Higher Education*, First International Conference on Software Engineering in Higher Education, Nov. 23-25, 1994; 431-438.

Mishchenko, N.M., "Properties of Extensible Programming Systems in the Proekt System," *Kibernetika*, 1975, 11(2), 91-94.

Morrison, I.W. et al., "The Design and Prototype Implementation of a "Structure Attribute" Model for Tool Interfacing within an IPSE," *Microprocessing and Microprogramming*, 1986, 18, 233-240.

Surveyer, J., "C+ = (C-Sharp= = Microsoft Java++)? True:False;", *Java Report*, Oct. 2000, 5 pages.

Zachmann, W., "The six key technologies for the future," *Industry*, 1981, 15-17.

"Java Core Reflection," http://web.archive.org/web/20000706224859/http://java.sun.com/j2se/1.3/docs/guide/reflection/spec/java-reflection.doc.html, Jul. 6, 2000, 1-7.

"Novell Announces Industry-First Implementation of Draft Java Naming and Directory Interface API", http://support.novell.com/techcenter/articles/dnd19970412.html, Apr. 1, 1997, 1-2.

Bunnell, K., "Extending the NDS Schema Object Class and Attribute Definitions", http://support.novell.com/techcenter/articles/dnd19971103.html, Nov. 1, 1997, 1-16.

Chung et al., "Modeling web applications using Java and XML related technologies", IEEE HICSS, Proceedings of the 35th Annual Hawaii International Conference on System Sciences, Jan. 10, 2002, 1-10.

Dandashi, "A method for assessing the reusability of object oriented code using a validated set of automated measurements," ACM SAC, Proceedings of the 2002 ACM symposium on Applied computing, Madrid, Spain, Mar. 10-14, 2002, 997-1003.

ECMA, "Draft C# Language Specification," Hewlett-Packard, Intel, Microsoft, pp. i-xiv, Mar. 2001, 1-381.

Gold, M., "Creating and Using Custom Attributes in C#", http://www.c-sharpcorner.com/1/CustomeAttribute.asp, Feb. 27, 2000, 1-4.

Hsiung et al., "Formal verification of embedded real time software in component based application frameworks", IEEE, Eighth Asia-Pacific Software Engineering Conference (APSEC'01), Macao, China, Dec. 4-7, 2001, 71-78.

In the United States Patent and Trademark Office, in re.: U.S. Appl. No. 09/900,113, filed Jul. 5, 2001, Final Office Action dated Aug. 3, 2006, 16 pages.

In the United States Patent and Trademark Office, in re.: U.S. Appl. No. 09/900,113, filed Jul. 5, 2001, Final Office Action dated Nov. 29, 2007, 19 pages.

In the United States Patent and Trademark Office, in re.: U.S. Appl. No. 09/900,113, filed Jul. 5, 2001, Non-Final Office Action dated Apr. 19, 2005, 33 pages.

In the United States Patent and Trademark Office, in re.: U.S. Appl. No. 09/900,113, filed Jul. 5, 2001, Non-Final Office Action dated Apr. 3, 2007, 19 pages.

In the United States Patent and Trademark Office, in re.: U.S. Appl. No. 09/900,113, filed Jul. 5, 2001, Non-Final Office Action dated Aug. 26, 2004, 33 pages.

In the United States Patent and Trademark Office, in re.: U.S. Appl. No. 09/900,113, filed Jul. 5, 2001, Non-Final Office Action dated Jan. 4, 2006, 30 pages.

In the United States Patent and Trademark Office, in re.: U.S. Appl. No. 09/900,123, filed Jul. 5, 2001, Final Office Action dated Jan. 30, 2008, 14 pages.

In the United States Patent and Trademark Office, in re.: U.S. Appl. No. 09/900,123, filed Jul. 5, 2001, Non-Final Office Action dated Apr. 28, 2009, 12 pages.

In the United States Patent and Trademark Office, in re.: U.S. Appl. No. 09/900,123, filed Jul. 5, 2001, Non-Final Office Action dated Aug. 15, 2008, 12 pages.

In the United States Patent and Trademark Office, in re.: U.S. Appl. No. 09/900,123, filed Jul. 5, 2001, Non-Final Office Action dated Jan. 23, 2007, 9 pages.

In the United States Patent and Trademark Office, in re.: U.S. Appl. No. 09/900,123, filed Jul. 5, 2001, Notice of Allowance and Fee(s) Due dated Jul. 12, 2007, 11 pages.

Keller et al., "Design components: Towards software composition at the design level", IEEE, 20th International Conference on Software Engineering (ICSE'98), Kyoto, Japan, Apr. 19-25, 1998, 302-311.

Kramer et al., "Configuring Object-based Distributed Programs in REX", Software Engineering Journal, Mar. 1992, 7(2), 139-149.

Lee et al., "A reengineering process for migrating from an object oriented legacy system to a component based system", IEEE COMPSAC, 27th Annual International Computer Software and Applications Conference, Dallas, Texas, Nov. 3-6, 2003, 1-6.

Microsoft Press, "Computer Dictionary", Third Edition, (no month available) 1997, pp. 91, 410.

Pandey et al., "BOTS: A constraints based component system for synthesizing scalable software systems", ACM LCTES, Conference on Languages, Compilers, and Tools for Embedded Systems, Ottawa, Canada, Jun. 14, 2006, 41(7), 189-198.

Pendharkar et al., "An empirical study of factors impacting the size of object oriented component code documentation", ACM SIGDOC, Proceedings of the 20th annual international conference on Computer documentation, Toronto, Ontario, Canada, Oct. 20-23, 2002, 152-156.

U.S. Appl. No. 09/900,123: Final Rejection, dated May 24, 2010, 12 pages.

\* cited by examiner

FIG. 3A

```
using System;
namespace FirstParty.Component {
        public class A {
                public virtual void F() {
                        Console.WriteLine("A.F()");
                }
        }
}
```

FIG. 3B

```
using System;
using FirstParty.Component;
namespace SecondParty.Application {
        class B: A {
                public void F(long count) {
                        for (int i = 0; i < count; i++)
                                Console.WriteLine("B.F(int)");
                }
                public void G() {
                        Console.WriteLine("B.G()");
                }
                static void Main() {
                        B b = new B();
                        b.F();
                        b.F(1);
                        b.G();
                }
        }
}
```

```
// version 2
using System;
using FirstParty.Component;
namespace SecondParty.Application {
        class B: A {                    414b
                new public void G() {
        432             Console.WriteLine("B.G");
                }
                static void Main() {
                        B b = new B();
                        b.G();
                }
        }
}
```

FIG. 4D

```
using System;
using FirstParty.Component;
namespace SecondParty.Application {
        class B: A {                    414b
                override public void G() {
        442             Console.WriteLine("B.G");
                }
                static void Main() {
                        B b = new B();
                        b.G();
                }
        }
}
```

```
using System;
class Test {
        static void F() {
                Console.WriteLine("Test.F");
        }
        static void F(int i) {
                Console.WriteLine("Test.F(int)");
        }
        static void Main() {
                F();
                F(3);
        }
}
```
500

FIG. 5B

```
Test.F
Test.F(int)
```
502

FIG. 5C

```
using System;
class A {
        public void F() {
                Console.WriteLine("Test.F");
        }
}
class B: A {
        public void F(int i) {
                Console.WriteLine("Test.F(int)");
        }
}
class Test {
        static void Main() {
                int i = 3;
                B b = new B();
                b.F();
                b.F(i);
        }
}
```
510

FIG. 5D

```
using System;
namespace FirstParty.Component {
        public class A {
        }
}
```
520

FIG. 5E

```
using System;
using FirstParty.Component;
namespace SecondParty.Application {
      class B: A {
              public void F(long count) {
                      for (int i = 0; i < count; i++)
                              Console.WriteLine("B.F(int)");
              }
              static void Main() {
                      int i = 3;
                      B b = new B();
                      b.F(i);
              }
      }
}
```
530

FIG. 5F

```
B.F(int)
```
540

```
class Base
{
        public void F() {}
}
class Derived: Base
{
        public void F() {}            // Warning,
hiding an inherited name
}
```

FIG. 6A

```
class Base
{
        public void F() {}
}
class Derived: Base
{
        new public void F() {}
}
```

```
class Base
{
        public static void F() {}
}
class Derived: Base
{
        new private static void F() {}      // Hides Base.F in Derived only
}
class MoreDerived: Derived
{
        static void G() { F(); }            // Invokes Base.F
}
```

```
interface ITest
{
        void F();                        // F()
        void F(int x);                   // F(int)
        void F(ref int x);               // F(ref int)
        void F(out int x);               // F(out int)
        void F(int x, int y);            // F(int, int)
        int F(string s);                 // F(string)
        int F(int x);                    // F(int)
        void F(string[] a);              // F(string[])
        void F(params string[] a);       // F(string[])
}
```

```
class A
{
        public void F() {
Console.WriteLine("A.F"); }
        public virtual void G() {
Console.WriteLine("A.G"); }
}
class B: A
{
        new public void F() {
Console.WriteLine("B.F"); }
        public override void G() {
Console.WriteLine("B.G"); }
}
class Test
{
        static void Main() {
                B b = new B();
                A a = b;
                a.F();
                b.F();
                a.G();
                b.G();
        }
}
```

```
class A
{
    public virtual void F() {
Console.WriteLine("A.F"); }
}
class B: A
{
    public override void F() {
Console.WriteLine("B.F"); }
}
class C: B
{
    new public virtual void F() {
Console.WriteLine("C.F"); }
}
class D: C
{
    public override void F() {
Console.WriteLine("D.F"); }
}
class Test
{
    static void Main() {
        D d = new D();
        A a = d;
        B b = d;
        C c = d;
        a.F();
        b.F();
        c.F();
        d.F();
    }
}
```

```
class A
{
    int x;
    public virtual void PrintFields() {
        Console.WriteLine("x = {0}", x);
    }
}
class B: A
{
    int y;
    public override void PrintFields() {
        base.PrintFields();
        Console.WriteLine("y = {0}", y);
    }
}
```

FIG. 9A

```
class A
{
    public virtual void F() {}
}
class B: A
{
    public virtual void F() {}        // Warning, hiding inherited F()
}
```

FIG. 9B

```
class A
{
    public virtual void F() {}
}
class B: A
{
    new private void F() {}    // Hides A.F within B
}
class C: B
{
    public override void F() {}    // Ok, overrides A.F
}
```

SYSTEM AND METHODS FOR PROVIDING VERSIONING OF SOFTWARE COMPONENTS IN A COMPUTER PROGRAMMING LANGUAGE

CROSS REFERENCE TO RELATED APPLICATIONS

This application is a Continuation of parent application Ser. No. 09/900,111, filed Jul. 5, 2001. This application relates to U.S. patent application Ser. Nos. 09/900,113 and 09/900,123.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2000, Microsoft Corp.

FIELD OF THE INVENTION

The present invention relates to versioning of software components of a computer programming language. More particularly, the present invention relates to the use of intelligent defaults, unambiguous specification of developer intent, and conflict resolution rules in connection with the versioning of software components in a programming language.

BACKGROUND OF THE INVENTION

In computing terms, a program is a specific set of ordered operations for a computer to perform. With an elementary form of programming language known as machine language, a programmer familiar with machine language can peek and poke data into and out from computer memory, and perform other simple mathematical transformations on data. Over time, however, the desired range of functionality of computer programs has increased quite significantly making programming in machine language generally cumbersome. As a result, proxy programming languages capable of being compiled into machine language and capable of much higher levels of logic have evolved. Examples of such evolving languages include COBOL, FORTRAN, Basic, PASCAL, C, C++, LISP, VISUAL BASIC, C# and many others. Some programming languages tend to be better than others at performing some types of tasks, but in general, the later in time the programming language was introduced, the more complex functionality that the programming language possesses empowering the developer more and more over time. Additionally, class libraries containing methods, classes and types for certain tasks are available so that, for example, a developer coding mathematical equations need not derive and implement the sine function from scratch, but need merely include and refer to the mathematical library containing the sine function.

Further increasing the need for evolved software in today's computing environments is that software is being transported from computing device to computing device and across platforms more and more. Thus, developers are becoming interested in aspects of the software beyond bare bones standalone personal computer (PC) functionality. To further illustrate how programming languages continue to evolve, in one of the first descriptions of a computer program by John von Neumann in 1945, a program was defined as a one-at-a-time sequence of instructions that the computer follows. Typically, the program is put into a storage area accessible to the computer. The computer gets one instruction and performs it and then gets the next instruction. The storage area or memory can also contain the data on which the instruction operates. A program is also a special kind of "data" that tells how to operate on application or user data. While not incorrect for certain simple programs, the view is one based on the simplistic world of standalone computing and one focused on the functionality of the software program.

However, since that time, with the advent of parallel processing, complex computer programming languages, transmission of programs and data across networks, and cross platform computing, the techniques have grown to be considerably more complex, and capable of much more than the simple standalone instruction by instruction model once known.

For more general background, programs can be characterized as interactive or batch in terms of what drives them and how continuously they run. An interactive program receives data from an interactive user or possibly from another program that simulates an interactive user. A batch program runs and does its work, and then stops. Batch programs can be started by interactive users who request their interactive program to run the batch program. A command interpreter or a Web browser is an example of an interactive program. A program that computes and prints out a company payroll is an example of a batch program. Print jobs are also batch programs.

When one creates a program, one writes it using some kind of computer language and the collection(s) of language statements are the source program(s). One then compiles the source program, along with any utilized libraries, with a special program called a language compiler, and the result is called an object program (not to be confused with object-oriented programming). There are several synonyms for an object program, including object module, executable program and compiled program. The object program contains the string of 0s and 1s called machine language with which the logic processor works. The machine language of the computer is constructed by the language compiler with an understanding of the computer's logic architecture, including the set of possible computer instructions and the bit length of an instruction.

Other source programs, such as dynamic link libraries (DLL) are collections of small programs, any of which can be called when needed by a larger program that is running in the computer. The small program that lets the larger program communicate with a specific device such as a printer or scanner is often packaged as a DLL program (usually referred to as a DLL file). DLL files that support specific device operation are known as device drivers. DLL files are an example of files that may be compiled at run-time.

The advantage of DLL files is that, because they don't get loaded into random access memory (RAM) together with the main program, space is saved in RAM. When and if a DLL file is needed, then it is loaded and executed. For example, as long as a user of Microsoft Word® is editing a document, the printer DLL file does not need to be loaded into RAM. If the user decides to print the document, then the Word application causes the printer DLL file to be loaded into the execution space for execution.

A DLL file is often given a ".dll" file name suffix. DLL files are dynamically linked with the program that uses them during program execution rather than being compiled with the main program. The set of such files (or the DLL) is somewhat comparable to the library routines provided with programming languages such as FORTRAN, Basic, PASCAL, C, C++, C#, etc.

The above background illustrates (1) that computer programming needs can change quickly in a very short time along with the changing computing environments in which they are intended to operate and (2) that computing programming environments are considerably more complex than they once were. As computing environments become more and more complex, there is generally a greater need for uniformity of functionality across platforms, uniformity among programming language editors, uniformity among programming language compilers and run time aspects of programming. In short, as today's computer system architectures have quickly expanded to the limits of the Earth via global networks, the types of programming tasks that are possible and desirable has also expanded to new limits. For example, since a program may traverse hundreds, if not hundreds of thousands of computers, as a result of copying, downloading or other transmission of the source code, developed by a plurality of unknown developers, affiliated with one another or not, the version of a program, program module, software component, class definition and the like may not always be understood or capable of disambiguation at a given destination or location. As a program undergoes several modifications or transformations, even the developer herself may no longer remember which version of a class, or other programming element, is in effect. In particular, there has grown a need for programmers and computing devices to be able to uniformly embed versioning information about various programming elements into software program elements.

Versioning is the process of evolving a component over time in a compatible manner. A new version of a component is source compatible with a previous version if code that depends on the previous version can, when recompiled, work with the new version. In contrast, a new version of a component is binary compatible if a program, application, service or the like that depends on the old version can work with the new version without recompilation of the program, application or service.

Binary compatibility is an important feature for a new version of a class library because it makes it possible for programs that depend on the old version of the class library to work compatibility with the new version of the class library, without compilation. Binary compatibility is particularly desirable because bug fixes and new features may be deployed in a more expedient and efficient manner. In the case of certain bug fixes, such as security-related bugs, speed can be a critical factor.

Source compatibility is also an important feature. A developer dealing with source code that depends on one version of a component is much more likely to want to upgrade to a new version of this component if the existing source code can recompile without compile-time errors or run-time semantic problems.

While some programming languages allow for some limited versioning functionality, thus far, no programming language has presented versioning capabilities that are adequate for today's distributed computing environments in which, inter alia, maximum control may not be available for exercising over end user client bits to control the versions of such bits. Thus, generally, as code evolves over time, and as new client bits are introduced into various computing systems, conflicts and ambiguities as to the most recent version of software components, classes and the like may occur.

Overloading describes a common versioning scenario wherein two methods or classes possess the same name, but they have different signatures due to different parameters/arguments. If it is not possible to simply add a method to a base class because it may create an overloading problem due to a new signature, for instance, a base class could never realistically evolve and existing programming systems routinely fail to deal with this situation. Developers are forced to work around this by either (1) versioning in an incompatible manner, thus forcing component consumers to recompile in order to get the benefits of simple changes, such as bug fixes, or (2) trying to version in a compatible manner by choosing member names that are unlikely to conflict with names introduced by base classes.

The first solution is obviously unacceptable since it defeats the purpose of compatibility, and is the main problem presented by versioning. The second solution is problematic for at least two reasons. First, it is not possible, in general, to choose names that will not conflict. For a base class in a popular system such as the WINDOWS® operating system, there can literally be millions of derived classes. With millions of people independently coming up with names, conflicts are quite likely to occur.

Second, intentionally choosing names that are not likely to conflict negatively impacts programmer productivity since these names are inherently more difficult to remember. For example, if the natural name for a method is "PerformTask," having the method instead be named "_PerformTask" negatively impacts the productivity of component consumers, who must remember whether to type "Perform Task," the name the method would have had if it were present in the original version or "_PerformTask," the intentionally mangled name.

Also, the widespread use of software components is a relatively new phenomenon. In today's computing environments, there is a lot of runtime functionality in the form of class libraries being supplied. Because of the large number of developers that consume these class libraries, there is a need for the (a) provision of compatible binary updates without breaking deployed code and (b) greater freedom to make as many changes as possible while maintaining binary compatibility.

As an early provider of component technology that allowed one component in binary form to depend on one or more other components in binary form, MICROSOFT® Corporation, the assignee of the present application, recognized early that binary-compatible versioning was an important feature. Thus, MICROSOFT®'s Object Linking and Embedding (OLE) software and VISUAL BASIC versions 4.0, 5.0 and 6.0 contained some infrastructure that enabled primitive forms of binary versioning. Despite these efforts, developers have continued to be hampered in these versioning scenarios. Thus, there is a continued need to address these versioning shortcomings in a more robust manner.

Despite such early attempts, most languages do not support binary compatibility at all, and many do little to facilitate source compatibility. In fact, some languages contain flaws that make it impossible, in general, to evolve a class over time without breaking at least some client code. OLE 2.0 and VISUAL BASIC 4.0/5.0/6.0 provided some limited support for binary versioning, none of which support provided an adequate solution to the versioning problems created by modern proliferation and evolution of class libraries and the like.

The C++ programming language deals with some overloading cases correctly. However, the C++ solution is not convenient for developers, and thus consumes additional time and computing resources. The C++ overload resolution rule only considers overloads defined at a single position in the inheritance hierarchy. If a developer wants overloads from both a base and a derived class to be considered, then the developer must add "forwarders" in the derived class that explicitly tell the compiler to consider the overloads in the base, thereby adding additional overhead to the program and making the programming task more complex.

Thus, it would be desirable to provide a robust system and methods for versioning software components in connection with a computer programming language. It would also be desirable to provide a versioning system that makes use of intelligent defaults. It would be further desirable to provide a versioning system that provides a vehicle for unambiguous specification of developer intent with respect to versioning of a software component. It would be further desirable to provide a versioning system that implements conflict resolution rules in connection with the versioning of software components in a programming language. It would be still further desirable to provide a versioning system that bounds names at run-time, but does not bound offsets at compile-time.

SUMMARY OF THE INVENTION

In view of the foregoing, the present invention provides a system and methods for versioning software components in connection with a computer programming language. In exemplary aspects, the versioning system makes use of intelligent defaults, provides a vehicle for unambiguous specification of developer intent and implements conflict resolution rules in connection with the versioning of software components. In another aspect, the versioning system bounds names at run-time, but does not bound offsets at compile-time.

Other features of the present invention are described below.

BRIEF DESCRIPTION OF THE DRAWINGS

The system and methods for providing versioning of software components of a programming language in a computing system are further described with reference to the accompanying drawings in which:

FIGS. 3A and 3B show computer programming language pseudocode illustrating an overview of the versioning process in accordance with the present invention;

FIGS. 4A, 4B, 4C, 4D, and 4E show computer programming language pseudocode illustrating an exemplary versioning problem and exemplary solution thereof in accordance with the present invention;

FIGS. 5A, 5B, 5C, 5D, 5E, and 5F show computer programming language pseudocode illustrating exemplary overloading versioning problems and exemplary solution thereof in accordance with the present invention;

FIGS. 6A, 6B, and 6C show computer programming language pseudocode illustrating exemplary aspects of name hiding through inheritance in accordance with the present invention;

FIG. 7 shows computer programming language pseudocode illustrating exemplary aspects of signatures and overloading in accordance with the present invention;

FIGS. 8A, 8B, 8C, and 8D show computer programming language pseudocode illustrating exemplary aspects of virtual versus non-virtual declarations in accordance with versioning of the present invention; and FIGS. 9A, 9B, 9C, and 9C show computer programming language pseudocode illustrating exemplary aspects of overriding in accordance with versioning of the present invention.

DETAILED DESCRIPTION OF PREFERRED EMBODIMENTS

Overview

Figure 1:
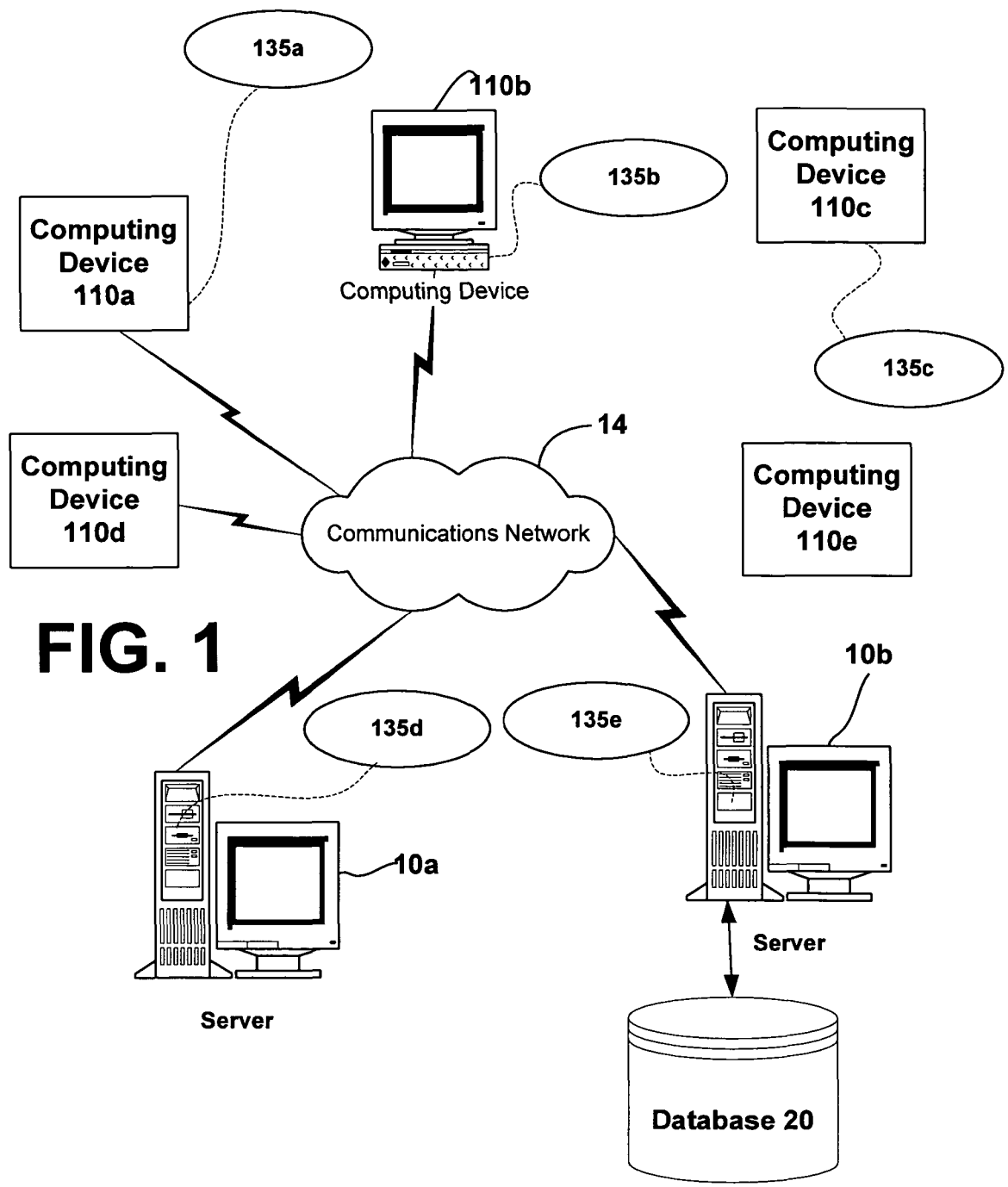
FIG. 1 is a block diagram representing an exemplary network environment in which the present invention may be implemented.

The present invention provides a system and methods for versioning software components in connection with computer programming languages. The versioning system provides intelligent defaults, a vehicle for unambiguous specification of developer intent and conflict resolution rules. In another aspect, the versioning system bounds names at run-time, but does not bound offsets at compile-time.

In exemplary non-limiting embodiments, the present invention provides a robust system and methods for versioning software components for C# programming language and components for a common language runtime (CLR) system. For C#, the versioning system provides intelligent defaults, a vehicle for unambiguous specification of developer intent and conflict resolution rules. For CLR, the versioning system bounds names at run-time, but does not bound offsets at compile-time.

Thus, in connection with C#, when intent is not clear, a system of intelligent defaults apply to minimize future conflicts and ambiguities in the event of code evolution. Further, virtual, new, and override keywords enable clear specification of programmer intent, so that a programmer can apply preventative maintenance to the versioning problem in advance. Further, method resolution rules are applied when there is conflict or ambiguity as to which of a plurality of methods apply. With CLR, names are bound at runtime and offsets are not bound at compile-time.

FIGS. 3A and 3B illustrate code that serves as a basis for providing an overview of a common versioning scenario. Most binary versioning scenarios involve two or more independently developed components. A common scenario is for a component consumer to purchase a component written by another developer or another organization. As an example, consider the application and component reflected by code 300 shown in FIG. 3A provided by a first party, hereinafter "FirstParty." If code 300 is used by a second party, hereinafter "SecondParty," in an application 302, as shown in FIG. 3B, a versioning issue results.

From FirstParty's perspective, the versioning question is, "What additions or changes can I make to code 300 without breaking SecondParty's code of application 302?" It is important to remember that (1) FirstParty may know nothing about SecondParty's application code 302 and (2) there might be many pieces of code like or similar to SecondParty's application code 302. Thus, FirstParty cannot check in advance to see whether a change to code 300 would break code 302 and FirstParty cannot cooperate with SecondParty to facilitate changing code to preserve compatibility.

As one of ordinary skill in the art can appreciate, FirstParty can make many kinds of changes without breaking SecondParty's code 302. However, several possible changes are noteworthy in accordance with the present invention.

FirstParty can add a G method to class A even though SecondParty's B already has such a method. The two methods are treated as separate methods (i.e., B. G does not override A.

G). The use of virtual, override, and new keywords in C# enable this scenario, which is not addressed by other languages.

FirstParty can add an F(int count) method to class A even though SecondParty's B already has a more general method F(int long). Calls that bound to B.F(int long) continue to bind to this method even though the one in the base class is more specific. These semantics facilitate versioning by respecting the intent of SecondParty. It may be assumed that SecondParty would not have wanted to call A.F(int count) because A.F(int count) did not even exist at the time of compilation.

Other programming languages and systems do not handle these and other binary versioning cases correctly, and other programming languages currently limit the versioning flexibility of developers. Other aspects of the versioning of the present invention will become evident from the following description.

Exemplary Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to perform programming services, with the functionality or other aspect thereof evolving over time. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 or other storage element in accordance with the present invention, such as a database 20 for storing software having the versioning of the present invention. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Exemplary Computing Device

Figure 2:
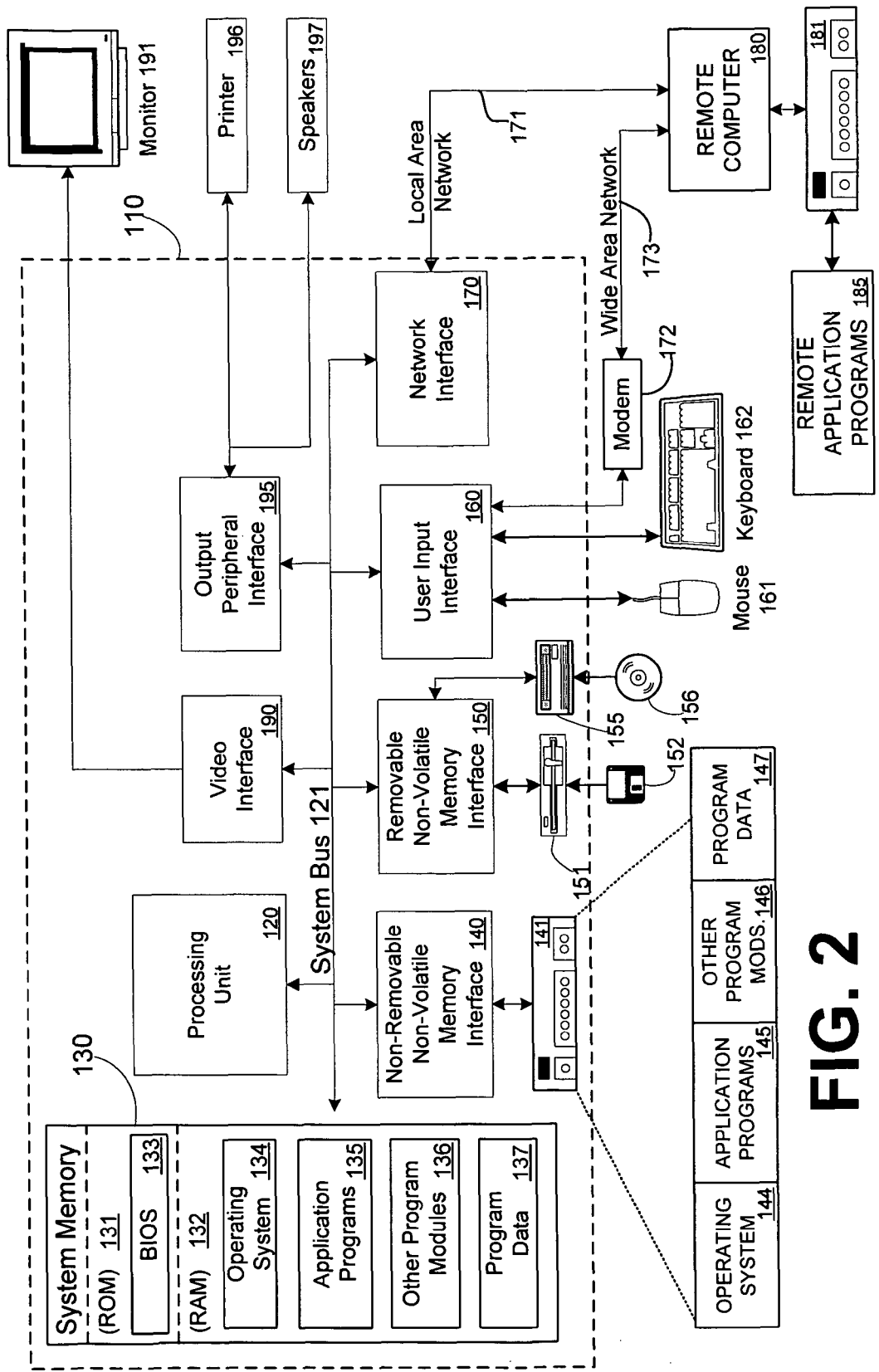
FIG. 2 is a block diagram representing an exemplary non-limiting computing device that may be present in an exemplary network environment, such as described in FIG. 1.

FIG. 2 and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example, and such a computing device may include a browser for connecting to a network, such as the Internet. Additionally, the present invention may be implemented in an environment of networked hosted services in which very little or minimal client resources are implicated, e.g., a networked environment in which the client device serves merely as a browser or interface to the World Wide Web.

Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Software may be designed using many different methods, including object-oriented programming methods. C++, JAVA, etc. are examples of common object-oriented programming languages that provide functionality associated with object-oriented programming. Object-oriented programming methods provide a means to encapsulate data members, e.g. variables, and member functions, e.g. methods, that operate on that data into single entity called a class. Object-oriented programming methods also provide means to create new classes based on existing classes.

An object is an instance of a class. The data members of an object are attributes that are stored inside the computer memory, and the methods are executable computer code that act upon this data, along with potentially providing other services. The present invention provides a robust system and techniques for versioning programming elements such as classes and methods.

Exemplary Languages and the .NET Framework

In exemplary embodiments of custom attributes as described herein, the present invention is described in connection with the C# programming language and CLR systems. However, one of ordinary skill in the art will readily recognize that the versioning techniques of the present invention may be implemented with any programming language, such as FORTRAN, PASCAL, VISUAL BASIC, C, C++, JAVA, etc.

C# is a simple, modern, object oriented, and type-safe programming language derived from C and C++. C#, pronounced "C sharp" like the musical note, is firmly planted in the C and C++ family tree of languages, and will be familiar to programmers having an understanding of the C and C++ programming languages, and other object-oriented programming languages. Generally, C# combines the high productivity of VISUAL BASIC and the raw power of C++, and provides many unique programming features as well.

C# is provided as part of Microsoft Visual Studio 7.0. In addition to C#, Visual Studio supports VISUAL BASIC, VISUAL C++, and the scripting languages VBScript and JScript. All of these languages provide access to the Microsoft .NET platform, which includes a common execution engine and a rich class library. The Microsoft .NET platform defines a Common Language Subset (CLS), a sort of lingua franca that ensures seamless interoperability between CLS-compliant languages and class libraries. For C# developers, this means that even though C# is a new language, it has complete access to the same rich class libraries that are used by seasoned tools such as VISUAL BASIC and VISUAL C++. C# itself may not include a class library. The customizable attributes of the present invention are supported in all of Microsoft's .NET languages, and .NET itself provides literally hundreds of attribute classes.

.Net is a computing framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net platform includes servers, building-block services, such as Web-based data storage and downloadable device software.

Generally speaking, the .Net platform provides (1) the ability to make the entire range of computing devices work together and to have user information automatically updated and synchronized on all of them, (2) increased interactive capability for Web sites, enabled by greater use of XML (Extensible Markup Language) rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with C#, the versioning of the present invention may be supported in all of Microsoft's .NET languages, and .NET itself provides literally hundreds of attribute classes and other software components that may be versioned. In exemplary non-limiting embodiments, versioning functionality for C# and CLR is described.

Versioning

As described in the background, a robust solution for versioning support for programming languages, such as C#, is key technology for the future of program development for a variety of reasons. Robust versioning support technology differentiates a programming language from competing platforms that do not offer robust versioning support. The ability to version class libraries while maintaining binary compatibility is an important feature because it helps minimize the customer costs when new versions of class libraries are released, while still permitting the innovation based thereon.

Versioning—Intelligent Defaults

First, intelligent defaults are implemented that facilitate the versioning process. For example, C# uses several intelligent defaults that facilitate versioning support. By default, for instance, members have the most limited form of accessibility that makes sense for the member e.g., a method declaration with no accessibility modifiers that appears in a class is defaulted to be private to that class. Further by default, members are non-virtual rather than virtual.

Versioning—Specification of Intent

Second, developers of programs, such as C# programs, are able to specify programmer intent with regard to versioning via virtual, new, and override keywords. C#'s use of the keywords virtual, new, and override keywords enable developers to clearly and unambiguously specify intent with regard to overriding. Such specification of intent may include whether a member can be overridden, whether a member hides or could hide another member and whether a member overrides another member.

In this regard, clear specification of intent is crucial for versioning. This is because the versioning intent of a program with clearly specified intent can be preserved as a result, despite subsequent version changes. The code of FIGS. 4A to 4C show an exemplary scenario illustrating a typical versioning issue.

Figure 4A:
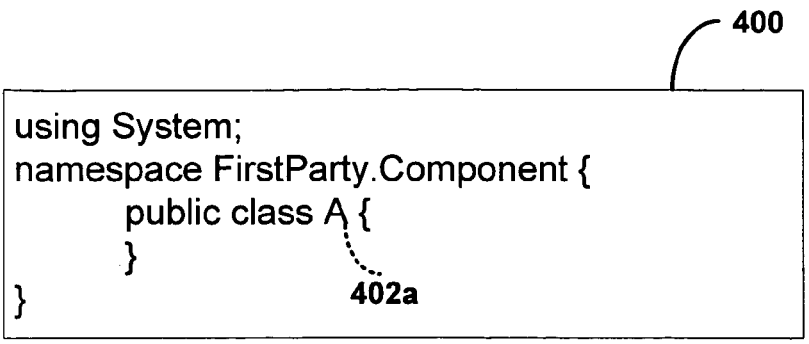

FIG. 4A illustrates code 400 written by base class author FirstParty who ships a class 402a, named A, which does not contain a G method.

Figure 4B:
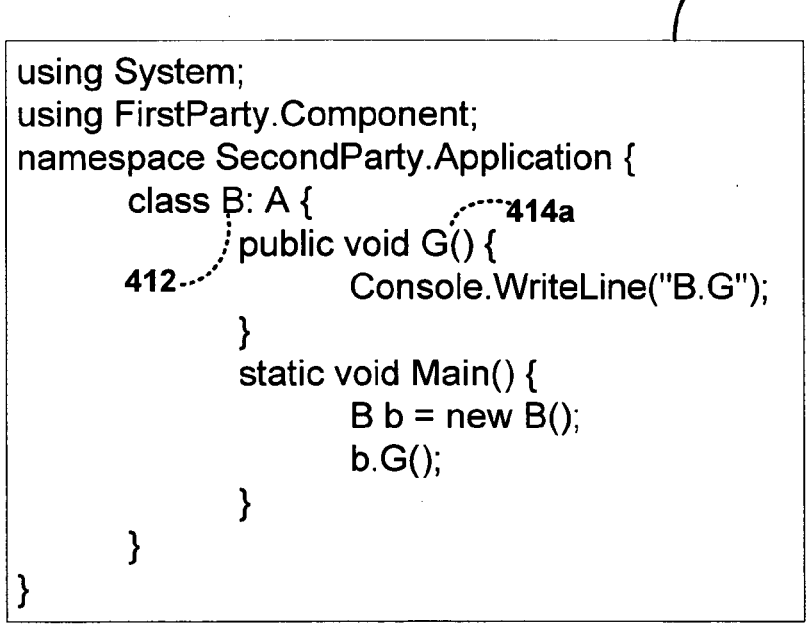
Figure 4C:
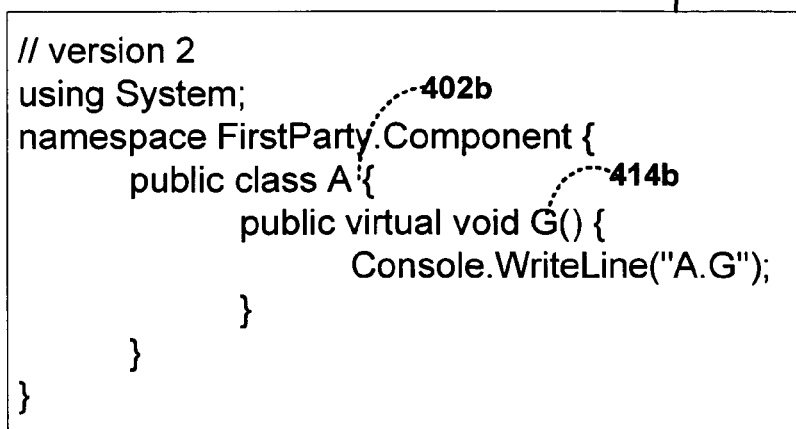

Then, the code 410 of FIG. 4B is written by SecondParty. Code 410 defines a software component 412, named B, which derives from class A and introduces a G method 414a. This B class, along with the class A upon which it depends, is released to customers, who deploy to numerous machines. So far, there is no versioning issue, but versioning trouble is encountered when FirstParty produces class 402b, a new version of Class A, which adds its own G method 414b.

This new version 402b of A should be both source and binary compatible with the initial version. If it were not possible to simply add a method 414b i.e., method G, then a base class could never evolve. As related in the background, existing programming systems routinely fail to deal with this situation, and developers are forced to work around this either (1) by versioning in an incompatible manner, thus forcing component consumers such as SecondParty to recompile in order to get the benefits of simple changes, such as bug fixes, or (2) by trying to version in a compatible manner by choosing member names that are unlikely to conflict with names introduced by base classes. The second solution is problematic because it is generally impossible to choose names that will not conflict in an environment having multitudinous names and millions of derived classes, because intentionally choosing names that are not likely to conflict negatively impacts programmer productivity.

In the exemplary versioning problem of FIGS. 4A to 4C, the new G 414*b* in A 402*b* calls into question the meaning of B 412's G 414*a*. Did SecondParty intend for B. G to override A.G? This seems unlikely, since when B 412 was compiled, A 402*a* did not even have a G 414*b*. Further, if B 412's G 414*a* does override A 402*b*'s G 414*b*, then it must adhere to the contract specified by A 402*b*, a contract that was unspecified when B 412 was written. In some cases, this is impossible. For example, the contract of A 402*b*'s G 414*b* might require that an overriding of it always call the base. B 412's G 414*a* could not possibly adhere to such a contract.

C# addresses this versioning problem by requiring developers to clearly state their intent. In the original code example, the code was clear, since A 402*a* did not even have a G 414*b*. Clearly, B 412's G 414*a* is intended as a new method rather than as an override of a base method, since no base method named G 414*b* exists at the time of B 412's development.

If A 402*b* adds G 414*b* and ships a new version, then the intent of a binary version of B 412 is still clear—B 412's G 414*a* is semantically unrelated, and should not be treated as an override of A 402*b*'s G 414*b*.

However, when B 412 is recompiled, is the meaning clear? Perhaps so, but perhaps not. SecondParty may want B 412's G 414*a* to override A 402*b*'s G 414*b*, or to hide it. To call attention to this choice, the C# compiler produces a warning, and by intelligent default makes B 412's G 414*a* hide A 402*b*'s G 414*b*. This course of action duplicates the semantics for the case in which B 412 is not recompiled. The warning that is generated alerts B 412's author to the presence of the G method 414*b* in A 402*b*. In this way, C# facilitates versioning of components in a source code compatible way.

If B 412's G 414*a* is semantically unrelated to A 402*b*'s G 414*b*, then SecondParty can express this intent, and in effect turn off the above warning, by using the new keyword 432 in the declaration of G 414*b*, as shown in FIG. 4D.

Still further, SecondParty may decide for any reason that B 412's G 414*a* should override A 402*b*'s G 414*b*. This intent can be specified by using the override keyword 442 in the declaration of G 414*b*, as shown in FIG. 4E.

In exemplary embodiments, in a system with inheritance principles, the use of the virtual keyword may also impact versioning. In C#, a base class is defined as either virtual, or non-virtual, which affects whether a derived class can override the base class. If a base method or class is virtual, for example, then a derived class must explicitly be specified as override in order to override the base method or class.

Another option for SecondParty is to change the name of G 414*a*, thus completely avoiding the name collision with G 414*b*. Though this change would break source and binary compatibility for B 412, the importance of this compatibility varies depending on the scenario. If B 412 is not exposed to other programs, then changing the name of G 414*b* is likely a good idea, as it would improve the readability of the program. There would no longer be any confusion about the meaning of G 414*b*.

Thus, as the above illustrates, C# facilitates the versioning of components in both binary compatible and source code compatible manners. For binary compatibility scenarios, C# preserves the semantics of the dependent program, specified by the developer at the time the code was compiled. For source code compatibility scenarios, the C# compiler preserves the prior semantics and emits a warning to alert the developer that an important choice is at hand.

Versioning—Resolution Rules

Third, developers of programs, such as C# programs, are able to benefit from method resolution rules implemented in accordance with the present invention. Overloading of methods permits a class, struct, or interface to declare multiple methods with the same name, provided the signatures of the methods are all unique. For instance, a class may define two methods with the same name, one that takes no arguments and one that takes an int argument. The program 500 of FIG. 5A has a class Test that has a method F that takes no arguments and a method F that takes an int argument i. The program 500 produces the output of FIG. 5B.

Overloading can also be performed in an inheritance chain, e.g., the two F methods could be instance methods, and could be in different classes A and B, as illustrated in code 510 of FIG. 5C.

Because overloaded methods, such as methods F, may appear in different locations in an inheritance chain, versioning is a concern. In some languages and programming systems, it is possible for a base class to accidentally break existing programs by introducing a new overloaded method. For instance, as shown in FIGS. 5D and 5E, consider a component 520 provided by FirstParty and an application 530 provided by SecondParty.

Initially, class B overrides class A, class A has no F method, and class B has an F method that takes a single argument of type long. In Main, the int argument can implicitly be converted to long, and so B's F is called, and according to the writeline function, the program outputs text 540, as illustrated in FIG. 5F.

If, however, FirstParty adds an F(int) method to class A, then the overload resolution rules must consider overloads from both class A and class B at the same time. Then, the set of candidate methods would be F(int), which was introduced in class A and F(long), which was introduced in class B. Presumably, A's F(int) would be selected because the type of its formal parameter is an exact match for the specified argument. From a versioning perspective, however, this choice is disastrous. When SecondParty originally wrote B, the call to F bound to B's F(long). Unless FirstParty has inadvertently and exactly duplicated the semantics of B's F, then it is very likely that FirstParty's seemingly innocuous addition of a method has broken SecondParty's code. Code that had previously bound to one routine has now bound to a completely different routine, despite the fact that no programmer intent indicates that these methods are to be so related.

C# addresses this scenario by providing a versioning-aware overload resolution. In an exemplary embodiment, the resolution rules are applied as follows: To locate the particular method ultimately invoked by a method invocation, the method begins by determining the type indicated by the method invocation, and proceeds checking up the inheritance chain until at least one applicable, accessible, non-override method declaration is found. Then, overload resolution is performed on the set of applicable, accessible, non-override methods declared in that type. Lastly, the method thus selected is invoked.

As applied to the foregoing example, these resolution rules indicate that the methods defined in B are considered first as the next matching method of the inheritance chain, and F(long) is selected. If no matching method had been found, then the search would have proceeded to look in A, and find F(int) would have been selected.

These overload resolution rules thus prevent a base class from inadvertently breaking a derived class when versioning the base. In other words, a developer of a base class is free to add a new method or a new overload of an existing method, without worrying about breaking existing code.

Versioning—Name Hiding through Inheritance

Name hiding through inheritance occurs when classes or structs redeclare names that were inherited from base classes. This type of name hiding generally takes one of the following forms: i) a constant, field, property, event, or type introduced in a class or struct that hides all base class members with the same name, ii) a method introduced in a class or struct that hides all non-method base class members with the same name, and all base class methods with the same signature i.e., the same method name and parameter count, modifiers and types and iii) an indexer introduced in a class or struct that hides all base class indexers with the same signature (parameter count and types).

The rules governing operator declarations make it impossible for a derived class to declare an operator with the same signature as an operator in a base class. Thus, operators never hide one another.

Contrary to hiding a name from an outer scope, hiding an accessible name from an inherited scope causes a warning to be reported. In the exemplary code 600 illustrated in FIG. 6A, the declaration of F in Derived causes a warning to be reported. Hiding an inherited name is specifically not an error, since that would preclude separate evolution of base classes. For example, the above situation might have come about because a later version of Base introduced an F method that was not present in an earlier version of the class. Had the above situation been an error, then any change made to a base class in a separately versioned class library could potentially cause derived classes to become invalid.

The warning caused by hiding an inherited name can be eliminated through use of the new modifier of the present invention, as illustrated in the exemplary code 610 of FIG. 6B. The new modifier indicates that the F in Derived is "new", and that it is indeed intended to hide the inherited member. A declaration of a new member hides an inherited member only within the scope of the new member.

Thus, in the exemplary code 620 of FIG. 6C, the declaration of F in Derived hides the F that was inherited from Base, but since the new F in Derived has private access, its scope does not extend to MoreDerived. Thus, the call F( ) in More-Derived.G is valid and invokes Base.F.

Versioning—Signatures and Overloading

Methods, constructors, indexers and operators may be characterized by their respective signatures. The signature of a method consists of the name of the method and the type and kind i.e., value, reference, or output, of each of its formal parameters. The signature of a method specifically does not include the return type, nor does it include the params modifier that may be specified for the last parameter. The signature of a constructor consists of the type and kind i.e., value, reference, or output, of each of its formal parameters. The signature of a constructor specifically does not include the params modifier that may be specified for the last parameter. The signature of an indexer consists of the type of each of its formal parameters. The signature of an indexer specifically does not include the element type. The signature of an operator consists of the name of the operator and the type of each of its formal parameters. The signature of an operator specifically does not include the result type.

Signatures are the enabling mechanism for overloading of members in classes, structs, and interfaces. Overloading of methods permits a class, struct, or interface to declare multiple methods with the same name, provided the signatures of the methods are all unique. Overloading of constructors permits a class or struct to declare multiple constructors, provided the signatures of the constructors are all unique. Overloading of indexers permits a class, struct, or interface to declare multiple indexers, provided the signatures of the indexers are all unique. Overloading of operators permits a class or struct to declare multiple operators with the same name, provided the signatures of the operators are all unique. The exemplary code of FIG. 7 shows a set of overloaded method declarations along with their signatures.

The ref and out parameter modifiers, described below, are part of a signature. Thus, F(int), F(ref int), and F(out int) are all unique signatures. Also, the return type and the params modifier are not part of a signature, and thus overloading does not occur solely based on return type or solely based on the inclusion or exclusion of the params modifier. Because of these restrictions, compiling the above example would produce errors for the methods with the duplicate signatures, namely duplicated signatures F(int) and F(string[ ]).

Versioning—C# Method Declarations, Invocations and Overload Resolutions

A method is a member that implements a computation or action that can be performed by an object or class. Methods are declared using method-declarations according to the following syntax:

```
method-declaration:
    method-header method-body
method-header:
    attributes_opt method-modifiers_opt return-type
    member-name ( formal-parameter-list_opt )
method-modifiers:
    method-modifier
    method-modifiers method-modifier
method-modifier:
    new
    public
    protected
    internal
    private
    static
    virtual
    sealed
    override
    abstract
    extern
return-type:
    type
    void
member-name:
    identifier
    interface-type . identifier
method-body:
    block
    ;
```

A method-declaration may include a set of attributes, a new modifier, an extern modifier, a valid combination of the four access modifiers, and a valid combination of the static, virtual, override and abstract modifiers. In addition, a method that includes the override modifier may also include the sealed modifier.

The static, virtual, override and abstract modifiers are mutually exclusive except in one case. The abstract and override modifiers may be used together so that an abstract method can override a virtual one.

The return-type of a method declaration specifies the type of the value computed and returned by the method. The return-type is void if the method does not return a value.

The member-name specifies the name of the method. Unless the method is an explicit interface member implementation, the member-name is simply an identifier. For an explicit interface member implementation, the member-name consists of an interface-type followed by a "." and an identifier.

The optional formal-parameter-list specifies the parameters of the method.

The return-type and each of the types referenced in the formal-parameter-list of a method must be at least as accessible as the method itself.

For abstract and extern methods, the method-body consists simply of a semicolon. For all other methods, the method-body consists of a block which specifies the statements to execute when the method is invoked.

The name and the formal parameter list of a method defines the signature of the method. Specifically, the signature of a method consists of its name and the number, modifiers, and types of its formal parameters. The return type is not part of a method's signature, nor are the names of the formal parameters.

The name of a method differs from the names of all other non-methods declared in the same class. In addition, the signature of a method must differ from the signatures of all other methods declared in the same class.

The parameters of a method, if any, are declared by the method's formal-parameter-list according to the following syntax:

```
formal-parameter-list:
    fixed-parameters
    fixed-parameters , parameter-array
    parameter-array
fixed-parameters:
    fixed-parameter
    fixed-parameters , fixed-parameter
fixed-parameter:
    attributes_opt parameter-modifier_opt type identifier
parameter-modifier:
    ref
    out
parameter-array:
    attributes_opt params array-type identifier
```

The formal parameter list consists of one or more fixed-parameters optionally followed by a single parameter-array, all separated by commas.

A fixed-parameter consists of an optional set of attributes, an optional ref or out modifier, a type, and an identifier. Each fixed-parameter declares a parameter of the given type with the given name.

A parameter-array consists of an optional set of attributes, a params modifier, an array-type, and an identifier. A parameter array declares a single parameter of the given array type with the given name. The array-type of a parameter array must be a single-dimensional array type. In a method invocation, a parameter array permits either a single argument of the given array type to be specified, or it permits zero or more arguments of the array element type to be specified.

A method declaration creates a separate declaration space for parameters and local variables. Names are introduced into this declaration space by the formal parameter list of the method and by local variable declarations in the block of the method. All names in the declaration space of a method must be unique. Thus, it is an error for a parameter or local variable to have the same name as another parameter or local variable.

A method invocation creates a copy, specific to that invocation, of the formal parameters and local variables of the method, and the argument list of the invocation assigns values or variable references to the newly created formal parameters. Within the block of a method, formal parameters can be referenced by their identifiers in simple-name expressions.

There are four kinds of formal parameters: Value parameters, Reference parameters, Output parameters and Parameter arrays. Value parameters are declared without any modifiers. Reference parameters are declared with the ref modifier. Output parameters are declared with the out modifier. Parameter arrays are declared with the params modifier.

As mentioned above, the ref and out modifiers are part of a method's signature, but the params modifier is not.

Methods may also be virtual. When an instance method declaration includes a virtual modifier, the method is said to be a virtual method. When no virtual modifier is present, the method is said to be a non-virtual method. It is an error for a method declaration that includes the virtual modifier to also include any one of the static, abstract, or override modifiers.

The implementation of a non-virtual method is invariant i.e., the implementation is the same whether the method is invoked on an instance of the class in which it is declared or invoked on an instance of a derived class. In contrast, the implementation of a virtual method can be changed by derived classes. The process of changing the implementation of an inherited virtual method is known as overriding the method and is described in more detail below.

In a virtual method invocation, the run-time type of the instance for which the invocation takes place determines the actual method implementation to invoke. In a non-virtual method invocation, the compile-time type of the instance is the determining factor. By way of example, when a method named N is invoked with an argument list A on an instance with a compile-time type C and a run-time type R, where R is either C or a class derived from C, the invocation is processed as follows:

First, the overload resolution, as described in more detail below, is applied to C, N, and A, to select a specific method M from the set of methods declared in and inherited by C. Then, if M is a non-virtual method, M is invoked. Otherwise, M is a virtual method, and the most derived implementation of M with respect to R is invoked. For every virtual method declared in or inherited by a class, there exists a most derived implementation of the method with respect to that class. The most derived implementation of a virtual method M with respect to a class R is determined as follows:

If R contains the introducing virtual declaration of M, then this is the most derived implementation of M. Otherwise, if R contains an override of M, then this is the most derived implementation of M. Otherwise, the most derived implementation of M is the same as that of the direct base class of R. FIGS. 8A and 8B illustrate exemplary code 800 and corresponding output 810 and show the differences between virtual and non-virtual methods.

In exemplary code 800, A introduces a non-virtual method F and a virtual method G. The class B introduces a new non-virtual method F, thus hiding the inherited F, and also overriding the inherited method G. The exemplary code 800 thus produces output 810. In this regard, it is of note that the statement a. G( ) invokes B. G, not A. G. This is because the run-time type of the instance, which is B, not the compile-time type of the instance, which is A, determines the actual method implementation to invoke.

Because methods are allowed to hide inherited methods, it is possible for a class to contain several virtual methods with the same signature. This does not present an ambiguity problem, since all but the most derived method are hidden. In the exemplary code 820 of FIG. 8C, the C and D classes contain two virtual methods with the same signature, namely the virtual method introduced by A and the virtual method introduced by C. The method introduced by C hides the method inherited from A. Thus, the override declaration in D overrides the method introduced by C, and it is not possible for D to override the method introduced by A.

Code 820 produces output 830 of FIG. 8D In this regard, it is notable that it is possible to invoke the hidden virtual method by accessing an instance of D through a less derived type in which the method is not hidden.

When an instance method declaration includes an override modifier, the method is said to be an override method. In accordance with the invention, an override method overrides an inherited virtual method with the same signature. Whereas a virtual method declaration introduces a new method, an override method declaration specializes an existing inherited virtual method by providing a new implementation of the method.

It is an error for an override method declaration to include any one of the new, static, or virtual modifiers. An override method declaration may include the abstract modifier. This enables a virtual method to be overridden by an abstract method.

The method overridden by an override declaration is known as the overridden base method. For an override method M declared in a class C, the overridden base method is determined by examining each base class of C, starting with the direct base class of C and continuing with each successive direct base class, until an accessible method with the same signature as M is located. For purposes of locating the overridden base method, a method is considered accessible if it is public, if it is protected, if it is protected internal, or if it is internal and declared in the same program as C.

A compile-time error occurs unless all of the following are true for an override declaration: (i) an overridden base method can be located, as described above, (ii) the overridden base method is a virtual, abstract, or override method i.e., the overridden base method cannot be static or non-virtual, (iii) the overridden base method is not a sealed method and (iv) the override declaration and the overridden base method have the same declared accessibility i.e., an override declaration cannot change the accessibility of the virtual method.

An override declaration can access the overridden base method using a base-access. This is illustrated by the exemplary code 900 of FIG. 9A, in which the base.PrintFields( ) invocation in B invokes the PrintFields method declared in A. A base-access disables the virtual invocation mechanism and simply treats the base method as a non-virtual method. Alternatively, had the invocation in B been written ((A)this).PrintFields( ), it would recursively invoke the PrintFields method declared in B, not the one declared in A.

Thus, only by including an override modifier can a method override another method. In all other cases, a method with the same signature as an inherited method simply hides the inherited method. In the exemplary code 910 of FIG. 9B, the F method in B does not include an override modifier and therefore does not override the F method in A. Rather, the F method in B hides the method in A, and a warning is reported because the declaration does not include a new modifier.

In the exemplary code 920 of FIG. 9C, the F method in B hides the virtual F method inherited from A. Since the new F in B has private access, its scope only includes the class body of B and does not extend to C. The declaration of F in C is therefore permitted to override the F inherited from A.

Versioning—Overload Resolution

Given an argument list and a set of candidate function members, overload resolution is a mechanism for selecting the best function member to invoke. Within C#, overload resolution selects the function member to invoke in the following distinct contexts: (i) invocation of a method named in an invocation-expression, (ii) invocation of a constructor named in an object-creation-expression, (iii) invocation of an indexer accessor through an element-access and (iv) invocation of a predefined or user-defined operator referenced in an expression.

Each of these contexts defines the set of candidate function members and the list of arguments in its own unique way. However, once the candidate function members and the argument list have been identified, the selection of the best function member is the same in all cases and is determined in accordance with the following procedure. First, the set of candidate function members is reduced to those function members that are applicable with respect to the given argument list. If this reduced set is empty, an error occurs. Then, given the set of applicable candidate function members, the best function member in that set is located. If the set contains only one function member, then that function member is the best function member. Otherwise, the best function member is the one function member that is better than all other function members with respect to the given argument list, provided that each function member is compared to all other function members using the rules described below with respect to better function members. If there is not exactly one function member that is better than all other function members, then the function member invocation is ambiguous and an error occurs.

In this regard, the following sections define the exact meanings of the terms applicable function member and better function member, as used above.

A function member is said to be an applicable function member with respect to an argument list A when all of the following are true: (i) the number of arguments in A is identical to the number of parameters in the function member declaration, (ii) for each argument in A, the parameter passing mode of the argument is identical to the parameter passing mode of the corresponding parameter, and (iiia) for a value parameter or a parameter array, an implicit conversion exists from the type of the argument to the type of the corresponding parameter, or (iiib) for a ref or out parameter, the type of the argument is identical to the type of the corresponding parameter.

For a function member that includes a parameter array, if the above rules apply to the function member, it is said to be applicable in its normal form. If a function member that includes a parameter array is not applicable in its normal form, the function member may instead be applicable in its expanded form according to the following.

The expanded form is constructed by replacing the parameter array in the function member declaration with zero or more value parameters of the element type of the parameter array such that the number of arguments in the argument list A matches the total number of parameters. If A has fewer arguments than the number of fixed parameters in the function member declaration, the expanded form of the function member cannot be constructed and is thus not applicable.

If the class, struct, or interface in which the function member is declared already contains another function member with the same signature as the expanded form, the expanded form is not applicable. Otherwise, the expanded form is applicable if for each argument in A, (i) the parameter passing mode of the argument is identical to the parameter passing mode of the corresponding parameter, and (iia) for a fixed value parameter or a value parameter created by the expansion, an implicit conversion exists from the type of the argument to the type of the corresponding parameter, or (iib) for a ref or out parameter, the type of the argument is identical to the type of the corresponding parameter.

The following rules apply to a determination of the better function member. Given an argument list A with a set of argument types $A_1, A_2, \ldots, A_N$ and two applicable function members $M_P$ and $M_Q$ with parameter types $P_1, P_2, \ldots, P_N$ and $Q_1, Q_2, \ldots, Q_N$, $M_P$ is defined to be a better function member than $M_Q$ if for each argument, the implicit conversion from $A_X$ to $P_X$ is not worse than the implicit conversion from $A_X$ to $Q_X$, and for at least one argument, the conversion from $A_X$ to $P_X$ is better than the conversion from $A_X$ to $Q_X$.

When performing this evaluation, if $M_P$ or $M_Q$ is applicable in its expanded form, then $P_X$ or $Q_X$ refers to a parameter in the expanded form of the parameter list.

The following rules apply to a determination of the better conversion. Given an implicit conversion $C_1$ that converts from a type S to a type $T_1$, and an implicit conversion $C_2$ that converts from a type S to a type $T_2$, the better conversion of the two conversions is determined according to the following rules. If $T_1$ and $T_2$ are the same type, neither conversion is better. If S is $T_1$, $C_1$ is the better conversion. If S is $T_2$, $C_2$ is the better conversion. If an implicit conversion from $T_1$ to $T_2$ exists, and no implicit conversion from $T_2$ to $T_1$ exists, $C_1$ is the better conversion. If an implicit conversion from $T_2$ to $T_1$ exists, and no implicit conversion from $T_1$ to $T_2$ exists, $C_2$ is the better conversion. If $T_1$ is sbyte and $T_2$ is byte, ushort, uint or ulong, $C_1$ is the better conversion. If $T_2$ is sbyte and $T_1$ is byte, ushort, uint or ulong, $C_2$ is the better conversion. If $T_1$ is short and $T_2$ is ushort, uint or ulong, $C_1$ is the better conversion. If $T_2$ is short and $T_1$ is ushort, uint or ulong, $C_2$ is the better conversion. If $T_1$ is int and $T_2$ is uint or ulong, $C_1$ is the better conversion. If $T_2$ is int and $T_1$ is uint or ulong, $C_2$ is the better conversion. If $T_1$ is long and $T_2$ is ulong, $C_1$ is the better conversion. If $T_2$ is long and $T_1$ is ulong, $C_2$ is the better conversion. Otherwise, neither conversion is better.

If an implicit conversion $C_1$ is defined by these rules to be a better conversion than an implicit conversion $C_2$, then it is also the case that $C_2$ is a worse conversion than $C_1$.

The process that takes place at run-time to invoke a particular function member is as follows. It is assumed that a compile-time process has already determined the particular member to invoke, possibly by applying overload resolution to a set of candidate function members. For purposes of describing the invocation process, function members are divided into two categories: static function members and instance function members.

Static function members are static methods, constructors, static property accessors, and user-defined operators. Static function members are always non-virtual. Instance function members are instance methods, instance property accessors, and indexer accessors. Instance function members are either non-virtual or virtual, and are always invoked on a particular instance. The instance is computed by an instance expression, and it becomes accessible within the function member as this. In C#, This-access consists of the reserved word this, and is permitted only in the block of a constructor, an instance method or an instance accessor.

The run-time processing of a function member invocation consists of the following steps, where M is the function member and, if M is an instance member, E is the instance expression. If M is a static function member, then the argument list is evaluated and M is invoked. If M is an instance function member declared in a value-type, then E is evaluated. If this evaluation causes an exception, then no further steps are executed. If E is not classified as a variable, then a temporary local variable of E's type is created and the value of E is assigned to that variable. E is then reclassified as a reference to that temporary local variable. The temporary variable is accessible as this within M, but not in any other way. Thus, only when E is a true variable is it possible for the caller to observe the changes that M makes to this. Next, the argument list is evaluated and M is invoked. The variable referenced by E becomes the variable referenced by this.

If M is an instance function member declared in a reference-type, then E is evaluated. If this evaluation causes an exception, then no further steps are executed. Then, the argument list is evaluated. If the type of E is a value-type, a boxing conversion is performed to convert E to type object, and E is considered to be of type object during the following steps.

The value of E is checked to be valid. If the value of E is null, a NullReferenceException is thrown and no further steps are executed. The function member implementation to invoke is determined then as follows. If M is a non-virtual function member, then M is the function member implementation to invoke. Otherwise, M is a virtual function member and the function member implementation to invoke is determined through virtual function member lookup or interface function member lookup. Lastly, the function member implementation determined in the previous step is invoked. The object referenced by E becomes the object referenced by this.

An invocation-expression is used to invoke a method and follows the following syntax:
    invocation-expression:
        primary-expression (argument-list$_{opt}$)

The primary-expression of an invocation-expression must be a method group or a value of a delegate-type. If the primary-expression is a method group, the invocation-expression is a method invocation. If the primary-expression is a value of a delegate-type, the invocation-expression is a delegate invocation. If the primary-expression is neither a method group nor a value of a delegate-type, an error occurs. The optional argument-list provides values or variable references for the parameters of the method.

The result of evaluating an invocation-expression is classified according to the following rules. If the invocation-expression invokes a method or delegate that returns void, the result is nothing. An expression that is classified as nothing cannot be an operand of any operator, and is permitted only in the context of a statement-expression. Otherwise, the result is a value of the type returned by the method or delegate.

For method invocations, the primary-expression of the invocation-expression must be a method group. The method group identifies the one method to invoke or the set of overloaded methods from which to choose a specific method to invoke. In the latter case, determination of the specific method to invoke is based on the context provided by the types of the arguments in the argument-list.

The compile-time processing of a method invocation of the form M(A), where M is a method group and A is an optional argument-list, consists of the following steps.

First, the set of candidate methods for the method invocation is constructed. Starting with the set of methods associated with M, which were found by a previous member lookup, the set is reduced to those methods that are applicable with respect to the argument list A. The set reduction consists of applying the following rules to each method T.N in the set, where T is the type in which the method N is declared:

If N is not applicable with respect to A, then N is removed from the set.

If N is applicable with respect to A, then all methods declared in a base type of T are removed from the set.

If the resulting set of candidate methods is empty, then no applicable methods exist, and an error occurs. If the candidate methods are not all declared in the same type, the method invocation is ambiguous, and an error occurs (this latter situation can only occur for an invocation of a method in an interface that has multiple direct base interfaces.

The best method of the set of candidate methods is identified using the overload resolution rules. If a single best method cannot be identified, the method invocation is ambiguous, and an error occurs.

Given a best method, the invocation of the method is validated in the context of the method group: If the best method is a static method, the method group must have resulted from a simple-name or a member-access through a type. If the best method is an instance method, the method group must have resulted from a simple-name, a member-access through a variable or value, or a base-access. If neither of these requirements are true, a compile-time error occurs.

Once a method has been selected and validated at compile-time by the above steps, the actual run-time invocation is processed according to the rules of function member invocation described above.

As mentioned above, while exemplary embodiments of the present invention have been described in connection with C# and CLR, the underlying concepts may be applied to any programming language for which it would be desirable to have versioning as described herein. Thus, versioning in accordance with the present invention may be implemented with any programming language, such as FORTRAN, PASCAL, VISUAL BASIC, C, C++, JAVA, etc.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs utilizing the versioning of the present invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to include the versioning functionality of the present invention. For example, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of programming in a networked or NET computing environment, one skilled in the art will recognize that the present invention is not limited thereto, and that the methods of programming in a programming environment having versioning, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A method for providing versioning support for at least one software component of an object-oriented programming language, the method operating on a computer and comprising:

specifying programmer intent with regard to versioning of a first software component by assigning a keyword to said first software component, said keyword indicating how said first software component resolves an ambiguity or conflict with a second software component;

wherein said ambiguity or conflict arises due to the first software component having a first method associated with a first class and the second software component having a second method associated with said first class, and wherein said first method and said second method have the same designation.

2. A method according to claim 1, wherein said assigning of said keyword includes assigning at least one of virtual, new and override keywords.

3. A method according to claim 1, wherein said assigning of said keyword to said first software component specifies programmer intent with regard to whether said first software component overrides said second software component.

4. A method according to claim 1, wherein said assigning of said keyword to said first software component specifies programmer intent with regard to whether said first software component is capable of being overridden by said second software component.

5. A method according to claim 1, wherein said assigning of said keyword to said first software component specifies programmer intent with regard to whether said first software component hides said second software component.

6. A method according to claim 1, wherein said first software component is at least one member of the object-oriented programming language and the object-oriented programming language is from one of the sources of origin identified by C#, FORTRAN, PASCAL, VISUAL BASIC, C, C++, and JAVA.

7. A computer readable storage medium having stored thereon a plurality of computer-executable modules, the computer executable modules comprising:
 a versioning mechanism enabling a programmer to specify intent with regard to versioning of a first software component by assigning a keyword to said first software component, said keyword indicating how said first software component resolves an ambiguity or conflict with a second software component;
 wherein said ambiguity or conflict arises due to the first software component haying a first method associated with a first class and the second software component having a second method associated with said first class, and wherein said first method and said second method have the same designation.

8. A computer readable storage medium according to claim 7, wherein said assigning of said keyword includes assigning at least one of virtual, new and override keywords.

9. A computer readable storage medium according to claim 7, wherein said assigning of said keyword to said first software component specifies programmer intent with regard to whether said first software component overrides said second software component.

10. A computer readable storage medium according to claim 7, wherein said assigning of said keyword to said first software component specifies programmer intent with regard to whether said first software component is capable of being overridden by said second software component.

11. A computer readable storage medium according to claim 7, wherein said assigning of said keyword to said first software component specifies programmer intent with regard to whether said first software component hides said second software component.

12. A computer readable storage medium according to claim 7, wherein said first software component is at least one member of the object-oriented programming language and the object-oriented programming language is from one of the sources of origin identified by C#, FORTRAN, PASCAL, VISUAL BASIC, C, C++, and JAVA.

13. An object-oriented programming language stored on a computer for producing computer executable modules, comprising:
 a versioning mechanism enabling a programmer to specify intent with regard to versioning of a first software component by assigning a keyword to said first software component, said keyword indicating how said first software component resolves an ambiguity or conflict with a second software component;
 wherein said ambiguity or conflict arises due to the first software component having a first method associated with a first class and the second software component having a second method associated with said first class, and wherein said first method and said second method have the same designation.

14. An object-oriented programming language stored on a computer according to claim 13, wherein said assigning of said keyword includes assigning at least one of virtual, new and override keywords.

15. An object-oriented programming language stored on a computer according to claim 13, wherein said assigning of said keyword to said first software component specifies programmer intent with regard to whether said first software component overrides said second software component.

16. An object-oriented programming language stored on a computer according to claim 13, wherein said assigning of said keyword to said first software component specifies programmer intent with regard to whether said first software component is capable of being overridden by said second software component.

17. An object-oriented programming language stored on a computer according to claim 13, wherein said assigning of said keyword to said first software component specifies programmer intent with regard to whether said first software component hides said second software component.

18. A method for providing versioning support for at least one software component of an object-oriented programming language, the method operating on a computer and comprising:
 specifying programmer intent with regard to versioning of a first software component by assigning intelligent defaults to said first software component, wherein by default when said first software component comprises a method declaration with no accessibility modifier appearing in a corresponding class, said method declaration is defaulted to be private to said corresponding class.

* * * * *